United States Patent [19]

Martell et al.

[11] Patent Number: 5,546,597

[45] Date of Patent: Aug. 13, 1996

[54] READY SELECTION OF DATA DEPENDENT INSTRUCTIONS USING MULTI-CYCLE CAMS IN A PROCESSOR PERFORMING OUT-OF-ORDER INSTRUCTION EXECUTION

[75] Inventors: Robert W. Martell, Hillsboro; Glenn J. Hinton, Portland; Michael A. Fetterman, Hillsboro; David B. Papworth, Beaverton; Robert P. Colwell, Portland; Andrew F. Glew, Hillsboro, all of Oreg.

[73] Assignee: Intel Corporation, Santa Clara, Calif.

[21] Appl. No.: 203,050

[22] Filed: Feb. 28, 1994

[51] Int. Cl.$^6$ .............................. G06F 9/345; G06F 9/38
[52] U.S. Cl. .................. 395/800; 395/375; 364/DIG. 1; 364/232.23; 364/232.22; 364/231.8; 364/239.4
[58] Field of Search ................................ 365/800, 375; 395/800, 375, 435

[56] References Cited

FOREIGN PATENT DOCUMENTS

WO9301545  1/1993  WIPO .

OTHER PUBLICATIONS

Patterson et al.; *Computer Architecture A Quantitative Approach*, 1990, pp. 261–269.
Mike Johnson, "Superscalar Microprocessor Design", entire book, Prentice Hall, 1991.
V. Popescu, et al., "The Metaflow Architecture", IEEE Micro, 1991, pp. 10–13, and 63–73.

*Primary Examiner*—Larry D. Donaghue
*Attorney, Agent, or Firm*—Blakely, Sokoloff, Taylor & Zafman

[57] ABSTRACT

An instruction dispatch circuit is disclosed that improves instruction execution throughput for a processor. The instruction dispatch circuit comprises an instruction buffer with a plurality of instruction entries and a content addressable memory array having at least one cam entry corresponding to each instruction entry. Each cam entry stores at least one source tag for the corresponding instruction entry. The content addressable memory array matches to a result tag from an execution circuit over a result bus, wherein the execution circuit transfers the result tag over the result bus at least one clock cycle before transferring a corresponding result data value over the result bus. Each cam entry generates a cam match signal used to determine whether data dependent instruction are ready for dispatch.

22 Claims, 8 Drawing Sheets

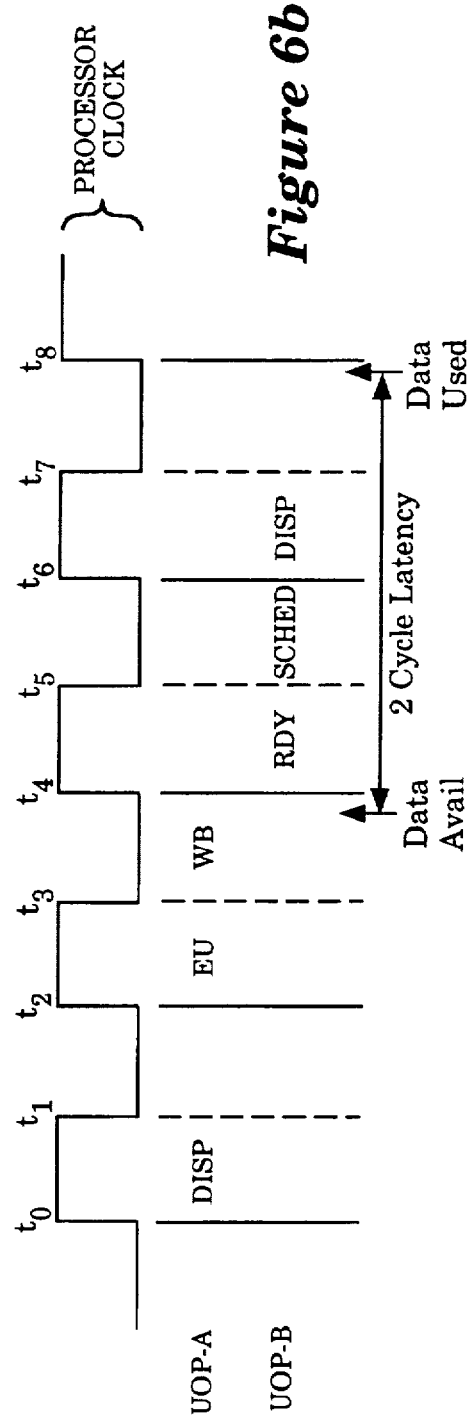

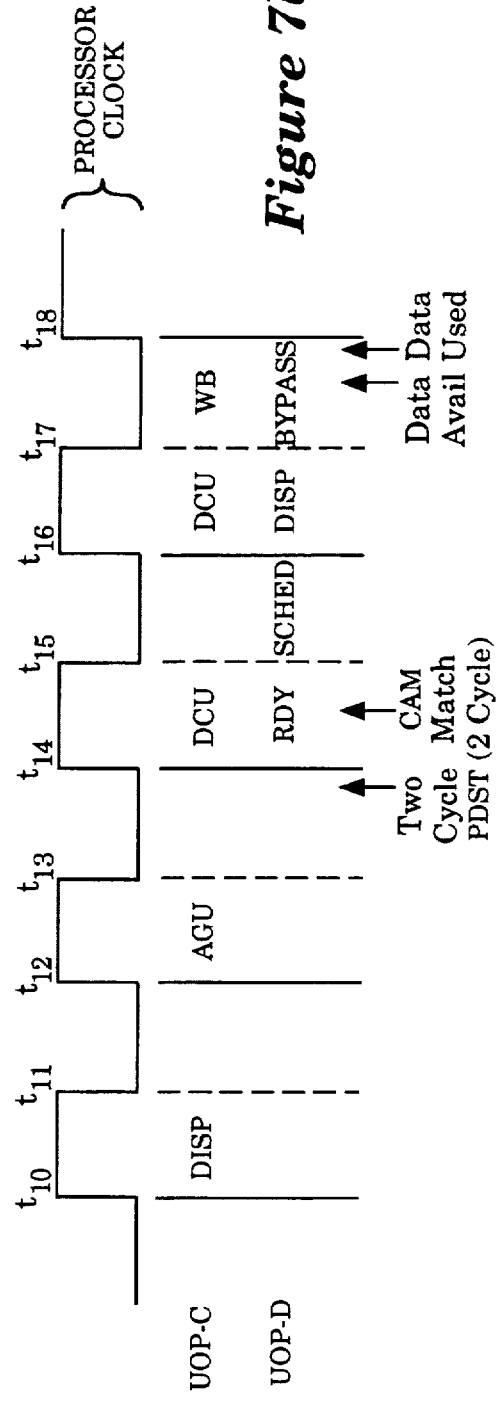

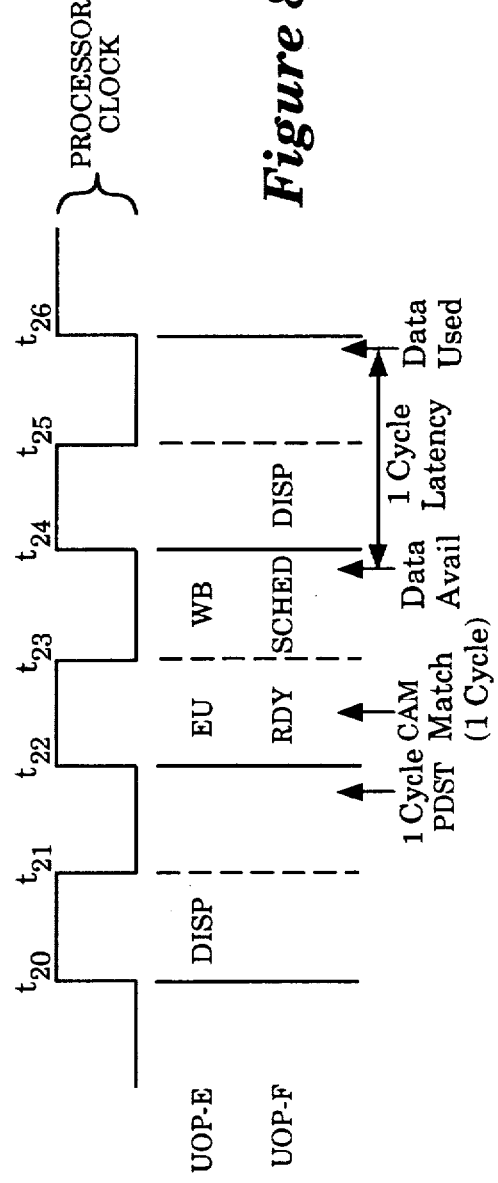

READY SELECTION OF DATA DEPENDENT INSTRUCTIONS USING MULTI-CYCLE CAMS IN A PROCESSOR PERFORMING OUT-OF-ORDER INSTRUCTION EXECUTION

BACKGROUND OF THE INVENTION

1. Field of the Invention

The present invention pertains to the field of computer systems. More particularly, this invention relates to selection of instructions ready for dispatch in a processor that performs out-of-order instruction execution.

2. Background

Typical prior computer processors implement in-order instruction execution pipelines. An in-order processor usually fetches an instruction stream from a memory, and executes each instruction in the instruction stream according to a sequential program order. Such in-order instruction execution ensures that data dependencies among the instructions are strictly observed.

A processor may perform out-of-order instruction execution to increase instruction execution performance. Such a processor executes ready instructions in the instruction stream ahead of earlier instructions in the program order that are not ready. A ready instruction is typically an instruction having fully assembled source data and available execution resources. Typically, the source data or operands for an instruction comprises the contents of one or more internal processor registers, or immediate source data, or a combination thereof.

Such out-of-order execution improves processor performance because the instruction execution pipeline of the processor does not stall while awaiting source data or execution resources for a non-ready instruction. For example, an instruction in the instruction stream may require source data from a processor register, wherein the processor register is loaded by a pending external memory fetch operation. Such an instruction awaiting the results of the external memory fetch does not stall the execution of later instructions in the instruction stream that are ready to execute.

A processor that performs out-of-order instruction execution typically buffers pending instructions in a dispatch buffer while determining whether the pending instructions are ready for dispatch. Typically, a pending instruction is ready for dispatch if the execution resources and source data required by the pending instruction are available.

Pending instructions in the dispatch buffer are often data dependent on previously dispatched instructions. A pending instruction is data dependent on a dispatched instruction if the pending instruction requires the execution results of the dispatched instruction as source data. As a consequence, a pending data dependent instruction must usually wait for the execution results of one or more dispatched instructions before becoming ready for dispatch.

Prior processors that dispatch instructions out-of-order commonly employ content addressable memories to link the execution results from dispatched instructions to the pending instructions that are data dependent on the execution results. For example, such a prior processor may employ a content addressable memory to match one or more source data tags for a pending instruction to result tags of the execution results. The result tags are typically detected by the content addressable memory during write back of the execution results to a result buffer or internal processor registers.

Such a prior content addressable memory scheme typically generates write enable signals if the source data tags match the result tags. The write enable signals are usually employed to write the execution results into the dispatch buffer during write back. Thereafter, the ready instructions are typically selected from among the pending instructions, and the ready instructions are scheduled for dispatch.

Unfortunately in such prior processors, the selection of ready instructions from the pending instructions, and the scheduling of the ready instructions begins after the execution results for data dependent instructions are written into the dispatch buffer. Moreover, such ready determination and instruction scheduling functions usually require several processor clock cycles for completion. As a consequence, a multicycle latency typically occurs between the time that the execution results are available and the time that the execution results dispatched along with the data dependent instructions. Such a latency prevents back-to-back dispatching of data dependent instructions, and thereby reduces overall instruction throughput in such a processor.

SUMMARY AND OBJECTS OF THE INVENTION

One object of the present invention is to select instructions that are ready for dispatch in a processor that performs out-of-order instruction execution.

Another object of the present invention is to improve instruction execution throughput by selecting and scheduling data dependent instructions before the execution results required by the data dependent instructions are available.

Another object of the present invention is to select data dependent instructions for scheduling at least one clock cycle before the execution results required by the data dependent instructions are available.

Another object of the present invention is to employ a content addressable memory to detect a result tag at least one clock cycle before a result data value corresponding to the result tag is available.

A further object of the present invention is to employ a content addressable memory to detect the result tag at least one clock cycle before the result data value is available, and to schedule and dispatch the data dependent instructions during the two clock cycles between detection of the result tag and the availability of the result data value.

Another object of the present invention is to schedule and dispatch the data dependent instructions over a dispatch bus such that the data dependent instructions are available on the dispatch bus during the clock cycle that the result data value is available on a result bus.

A further object of the present invention is to merge the result data value on the result bus into the source data for the data dependent instructions on the dispatch bus.

These and other objects of the invention are provided by an instruction dispatch circuit comprising an instruction buffer with a plurality of instruction entries. Each instruction entry contains at least one source data field for buffering source data for an instruction. The instruction dispatch circuit further comprises a content addressable memory array having at least one cam entry corresponding to each instruction entry. Each cam entry stores at least one source tag for the corresponding instruction entry.

The content addressable memory array receives a result tag from an execution circuit over a result bus, wherein the execution circuit transfers the result tag over the result bus at least one clock cycle before transferring a corresponding result data value over the result bus. Each cam entry generates a cam match signal if the result tag matches the stored source tag. A ready generation circuit receives the cam match signals and selects each instruction that corresponds to the result tag as a ready instruction. The ready instructions are then scheduled for dispatch to the execution circuit.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 6a illustrates micro-op dispatch by the reservation station circuit without one and two cycle CAM ready scheduling;

FIG. 6b illustrates a two cycle latency which occurs between the time the result data from UOP-A is available on the result data bus and the time the corresponding dependent source data for UOP-B arrives at the execution unit;

FIG. 7a illustrates micro-op dispatch by the reservation station circuit with two cycle CAM ready scheduling;

FIG. 7b illustrates the dispatch and execution of the micro ops in reservation station entries RS0 and RS1 with two cycle CAM ready scheduling;

FIG. 8a illustrates micro-op dispatch by the reservation station circuit with one cycle CAM ready scheduling;

FIG. 8b illustrates a one cycle latency occurring between the time the result data from UOP-E is available on the result data bus and the time that the corresponding dependent source data for UOP-F arrives at the execution unit.

DETAILED DESCRIPTION

Figure 1:
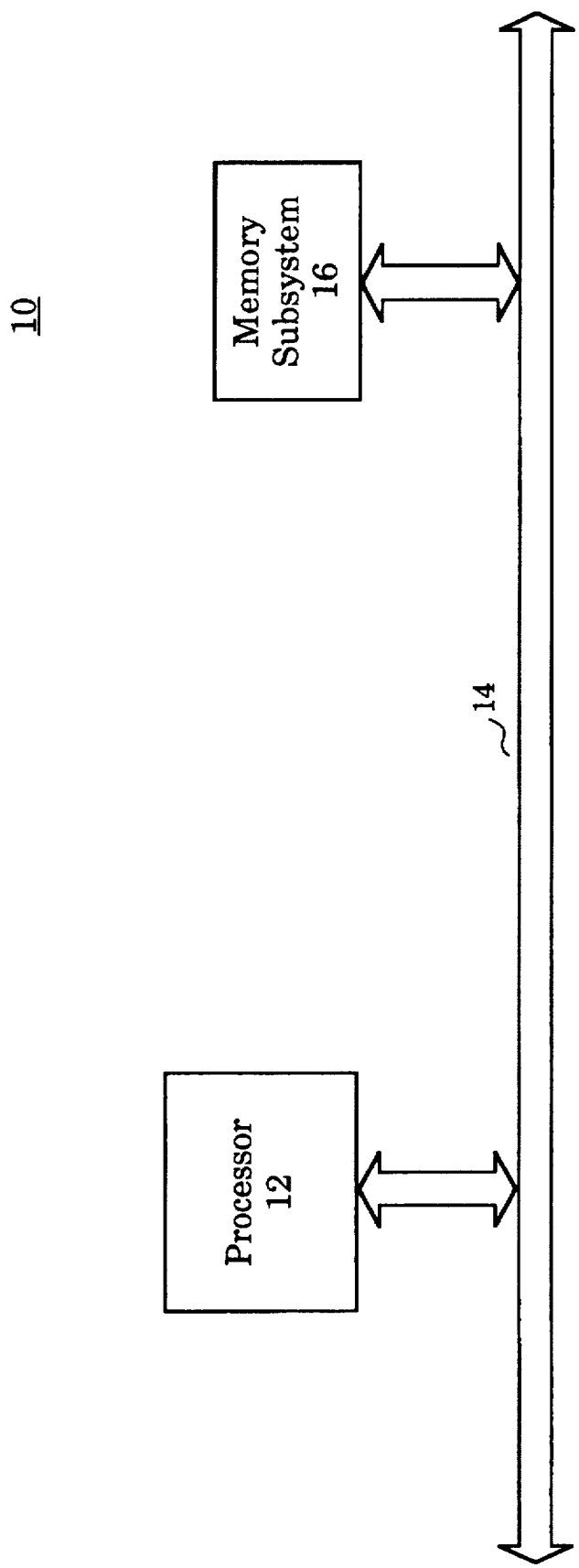
FIG. 1 illustrates a computer system comprising a processor, and a memory subsystem.

FIG. 1 illustrates a computer system 10. The computer system 10 comprises a processor 12 and a memory subsystem 16. The processor 12 and the memory subsystem 16 communicate over a host bus 14.

The processor 12 fetches a stream of instructions from the memory subsystem 16 over the host bus 14. The processor 12 executes the stream of instructions and maintains data storage in the memory subsystem 16.

Figure 2:
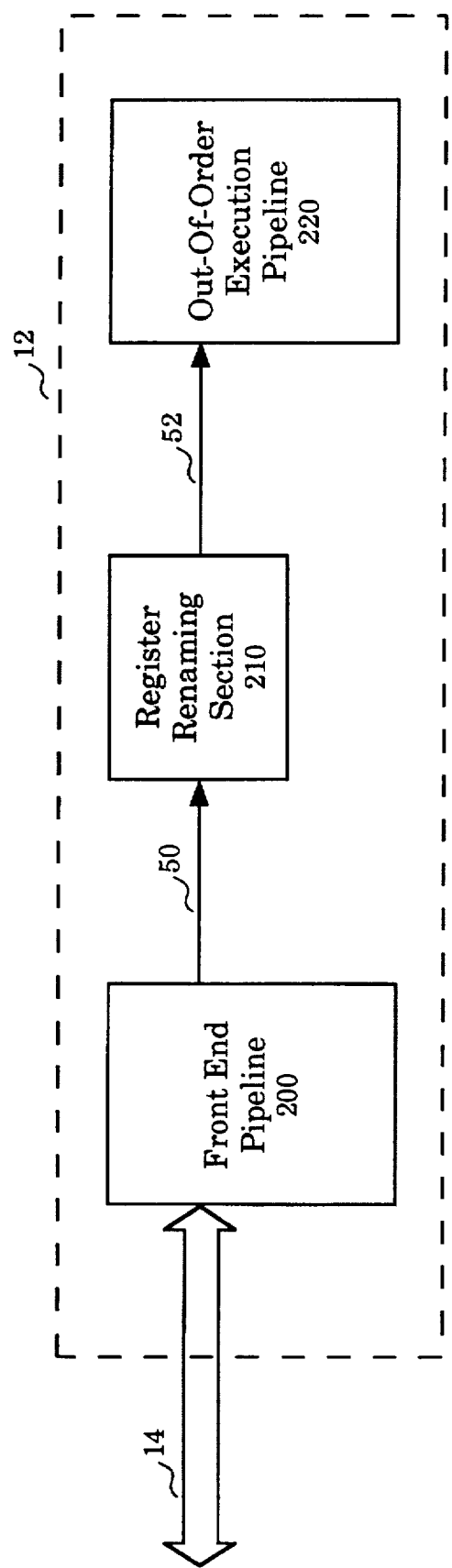
FIG. 2 is a block diagram of a processor for one embodiment wherein the processor comprises a front end pipeline, a register renaming section, and an out-of-order execution pipeline.

FIG. 2 illustrates the processor 12 for one embodiment. The processor 12 comprises a front end pipeline 200, a register renaming section 210, and an out-of-order execution pipeline 220.

The front end pipeline 200 fetches instructions over the host bus 14, performs speculative branch prediction for the instructions, and issues an in-order stream of logical micro operations, hereinafter referred to as logical micro-ops. The front end pipeline 200 generates one or more logical micro-ops for each instruction fetched from the memory subsystem 16. The front end pipeline 200 transfers the in-order stream of logical micro-ops over a logical micro-op bus 50.

For one embodiment, the instructions fetched by the front end pipeline 200 comprise Intel Architecture Microprocessor instructions. The Intel Architecture Microprocessor instructions operate on a set of architectural registers, including an EAX register, an EBX register, an ECX register, and an EDX register, etc., as well as floating-point registers.

The logical micro-ops issued by the front end pipeline 200 are reduced instruction set micro operations that perform the function of the corresponding instruction. The logical micro-ops specify arithmetic and logical operations as well as load and store operations to the memory subsystem 16. Each logical micro-op may specify at least one register source operand and at least one immediate data operand. For one embodiment, the instruction decode circuit 26 issues up to four in-order logical micro-ops during each clock cycle of the processor 12.

Each logical micro-op on the logical micro-op bus 50 comprises an opcode, a pair of logical register sources and a logical register destination. The opcode specifies a function for the corresponding logical micro-op. Each logical register source may specify a register source for operand data, and the logical register destination may specify a register destination for result data for the corresponding logical micro-op. The register logical register sources and the logical register destinations of the logical micro-ops correspond to the architectural registers of the original instructions.

The register renaming section 210 receives the in-order logical micro-ops over the logical micro-op bus 50, and generates a corresponding set of in-order physical micro-ops by renaming the logical register sources and destinations of the logical micro-ops. The register renaming section 210 tracks the available resources in the out-of-order execution pipeline 220, and assigns the available resources to the physical micro-ops.

The register renaming section 210 maps the logical register sources and the logical register destination of each logical micro-op into physical register sources and a physical register destination, and transfers the in-order physical micro-ops over a physical micro-op bus 52. The physical register sources of the physical micro-ops specify physical registers contained in the out-of-order pipeline 220 that buffer speculative data or committed state registers in the out-of-order pipeline 220 that buffer committed architectural state data.

The register renaming section 210 implements a register alias table that specifies whether the current state for each architectural register is speculatively held in the out-of-order execution pipeline 220 or is retired to a committed state register in the out-of-order execution pipeline 220. The register alias table enables logical to physical register renaming by mapping the logical register sources and destinations to the physical register sources and destinations.

The physical register sources and destinations of the physical micro-ops specify reorder buffer (ROB) entries and committed state registers of the out-of-order execution pipeline 220.

Each entry in the register alias table stores a ROB pointer. The ROB pointer specifies a ROB entry in the out-of-order execution pipeline 220 assigned to buffer the speculative result data for the corresponding architectural register. The register renaming section 210 assigns the ROB entries of the out-of-order execution pipeline 220 to the physical micro-ops in the same order that logical micro-ops are received over the logical micro-op bus 50. Each entry in the register alias table also stores a real register file valid (rrfv) flag that indicates whether the speculative result data for the corresponding architectural register is contained the appropriate committed state register in the out-of-order execution pipeline 220.

The register renaming section 210 receives a set of in-order logical micro-ops lmop_0 through lmop_3 over the logical micro-op bus 50 during each pipeline clock of the processor 12. The register renaming section 210 transfers a corresponding set of in-order physical micro-ops pmop_0 through pmop_3 over the physical micro-op bus 52. Each physical micro-op comprises the opcode of the corresponding logical micro-op, a pair of physical register sources psrc1 and psrc2, and a physical register destination pdst. Each physical register destination pdst specifies a ROB entry in the out-of-order execution pipeline 220 to hold speculative result data for the corresponding physical micro-op.

The physical register sources psrc1 and psrc2 each specify a ROB entry or a committed state register in the out-of-order execution pipeline 220. Each physical register sources psrc1 and psrc2 on the physical micro-op bus 52 includes a corresponding rrfv flag. The rrfv flag indicates whether the corresponding physical register source specifies a ROB entry or a committed state register.

The register renaming section 210 generates the physical micro-ops by mapping the logical register sources of the logical micro-ops to the ROB entries and the committed state registers of the out-of-order execution pipeline 220 according to the register alias table. The register renaming section 210 assigns a ROB entry to each physical micro-ops pmop_0 through pmop_3, and merges the assigned physical register destinations into the physical register destinations pdst of the physical micro-ops pmop_0 through pmop_3.

The register renaming section 210 determines a physical register source for a physical micro-op by reading the register alias table entry specified by the corresponding logical register source. If the rrfv flag of the specified register alias table entry is not set, then the register renaming section 210 transfers the ROB pointer from the specified register alias table entry along with the corresponding rrfv flag over the physical micro-op bus 52 as the physical register source. If the rrfv flag of the specified entry is set, then the register renaming section 210 transfers a pointer to the committed state register in the out-of-order execution pipeline 220 that corresponds to the logical register source, and transfers the corresponding rrfv flag over the physical micro-op bus 52 as the physical register source.

The out-of-order execution pipeline 220 receives the in-order physical micro-ops over the physical micro-op bus 52 and the immediate operands over the immediate data bus 51. The out-of-order execution pipeline 220 executes the physical micro-ops according to the availability of speculative register source data and execution resources. The out-of-order execution pipeline 220 buffers the speculative result data from the out-of-order execution. The out-of-order execution pipeline 220 retires the speculative result data to an architectural state in the same order as the corresponding physical micro-ops are issued by the front end pipeline 200.

Figure 3:
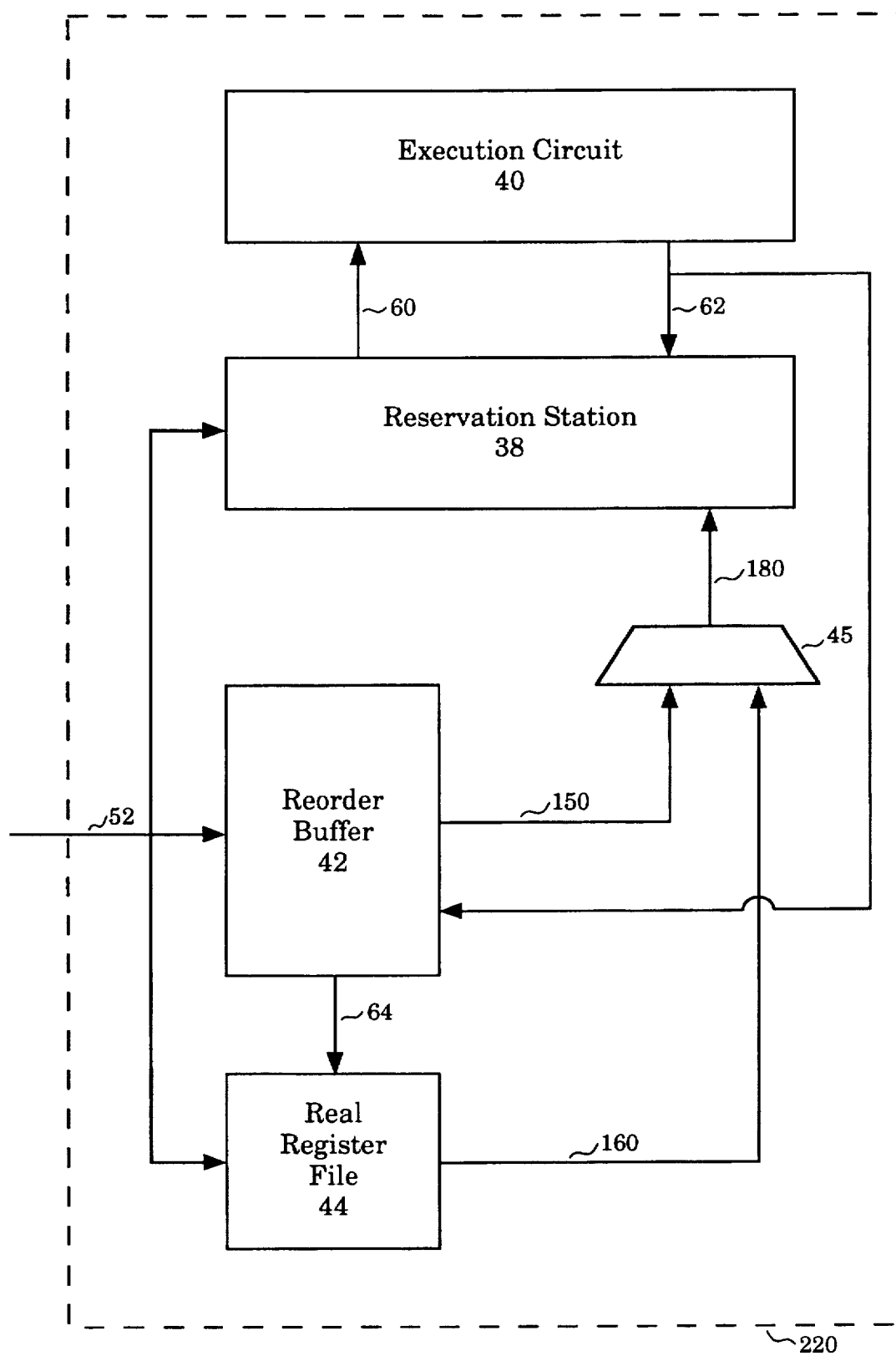
FIG. 3 illustrates the out-of-order execution pipeline for one embodiment which comprises a reorder buffer, a real register file, a reservation station circuit, and an execution circuit.

FIG. 3 illustrates the out-of-order execution pipeline 220 for one embodiment. The out-of-order execution pipeline 220 comprises a reorder buffer 42, a real register file 44, a reservation station circuit 38, and an execution circuit 40.

The reservation station circuit 38 buffers the physical micro-ops awaiting execution by an execution circuit 40. The reservation station circuit 38 receives the opcodes and physical register destinations for the physical micro-ops over the physical micro-op bus 52 and stores the opcodes and physical register destinations into reservation station entries assigned by the register renaming section 210. The reservation station circuit 38 assembles source data for the physical micro-ops, and dispatches the physical micro-ops to appropriate execution units in the execution circuit 40 according to availability of source, data and execution resources.

The reorder buffer 42 contains the ROB entries that buffer speculative results for the physical micro-ops. Each ROB entry in the reorder buffer 42 can buffer either integer or floating-point result data values. Each ROB entry contains a valid flag that indicates whether the corresponding result data value is valid.

The real register file 44 contains committed state registers that hold the committed state of the architectural registers of the original stream of instructions. The committed result data values in the committed state registers always provide valid source data.

The reorder buffer 42 and the real register file 44 receive the physical micro-ops over the physical micro-op bus 52. The physical register sources psrc1 and psrc2 of each physical micro-op can each specify either a ROB entry in the reorder buffer 42 or a committed state register in the real register file 44. Each physical register source psrc1 and psrc2 on the physical micro-op bus 52 includes a real register file valid (rrfv) flag that indicates whether the corresponding physical register source specifies a ROB entry or a committed state register.

The reorder buffer 42 reads the result data values and corresponding valid flags from the ROB entries specified by the physical register sources psrc1 and psrc2 of each physical micro-op pmop_0 through pmop_3. The reorder buffer 42 transfers the result data values and corresponding valid flags specified by the physical register sources psrc1 and psrc2 of each physical micro-op pmop_0 through pmop_3 over a source data bus 150 as speculative register source data values and valid flags.

The real register file 44 reads the result data values from the committed state registers specified by the physical register sources psrc1 and psrc2 of each physical micro-op pmop_0 through pmop_3. The real register file 44 transfers the result data values specified by the physical register sources psrc1 and psrc2 of each physical micro-op pmop_0 through pmop_3 over a source data bus 160 as committed state register source data values. The real register file 44 also transfers valid flags over the source data bus 160 to indicate that the committed state register source data values are valid.

A multiplexer circuit 45 selectively couples the speculative register source data values and valid flags on the source data bus 150 and the committed state register source data values and valid flags on the source data bus 160 onto a source data bus 180. The selections of the multiplexer 45 are controlled by the rrfv flags of the physical micro-ops pmop_0 through pmop_3 on the physical micro-op bus 52.

The reservation station circuit 38 receives the source data values and corresponding valid flags over the source data bus 180. The reservation station circuit 38 stores the source data values and corresponding valid flags into the reservation station entries assigned to the corresponding physical micro-ops.

The reservation station circuit 38 also receives source data values and corresponding valid flags for the pending physical micro-ops from the execution circuit 40 over a result bus 62 during a write back of result data values from the execution circuit 40 to the reorder buffer 42. The reservation station circuit 38 stores the write back source data values and corresponding valid flags into the reservation station entries assigned to the corresponding physical micro-ops.

The reservation station circuit 38 schedules the physical micro-ops having completely assembled source data values for execution. The reservation station circuit 38 dispatches the ready physical micro-ops to the execution circuit 40 over a micro-op dispatch bus 60. The reservation station circuit 38 schedules execution of physical micro-ops out-of-order according to the availability of the source data values for the physical micro-ops, and according to the availability of execution unit resources in the execution circuit 40.

The execution circuit 40 writes back the speculative result data values from the out-of-order execution of the physical micro-ops to the reorder buffer 42 over the result bus 62. The write back of speculative result data values by the execution circuit 40 is out-of-order due to the out-of-order dispatching of physical micro-ops by the reservation station circuit 38 and the differing number of processor cycles of the processor 12 required for execution of the differing types of physical micro-ops.

For one embodiment, the execution circuit 40 comprises a set of five execution units, and the reservation station circuit 38 dispatches up to five physical micro-ops concurrently to the execution circuit 40 over the micro-op dispatch bus 60.

The speculative results held in the physical registers of the reorder buffer 42 are committed to an architectural state in the same order as the original logical micro-ops were received. During a retirement operation, the reorder buffer 42 transfers the speculative result data values from a sequential set of ROB entries to the corresponding committed state registers of the real register file 44 over a retirement bus 64.

Figure 4:
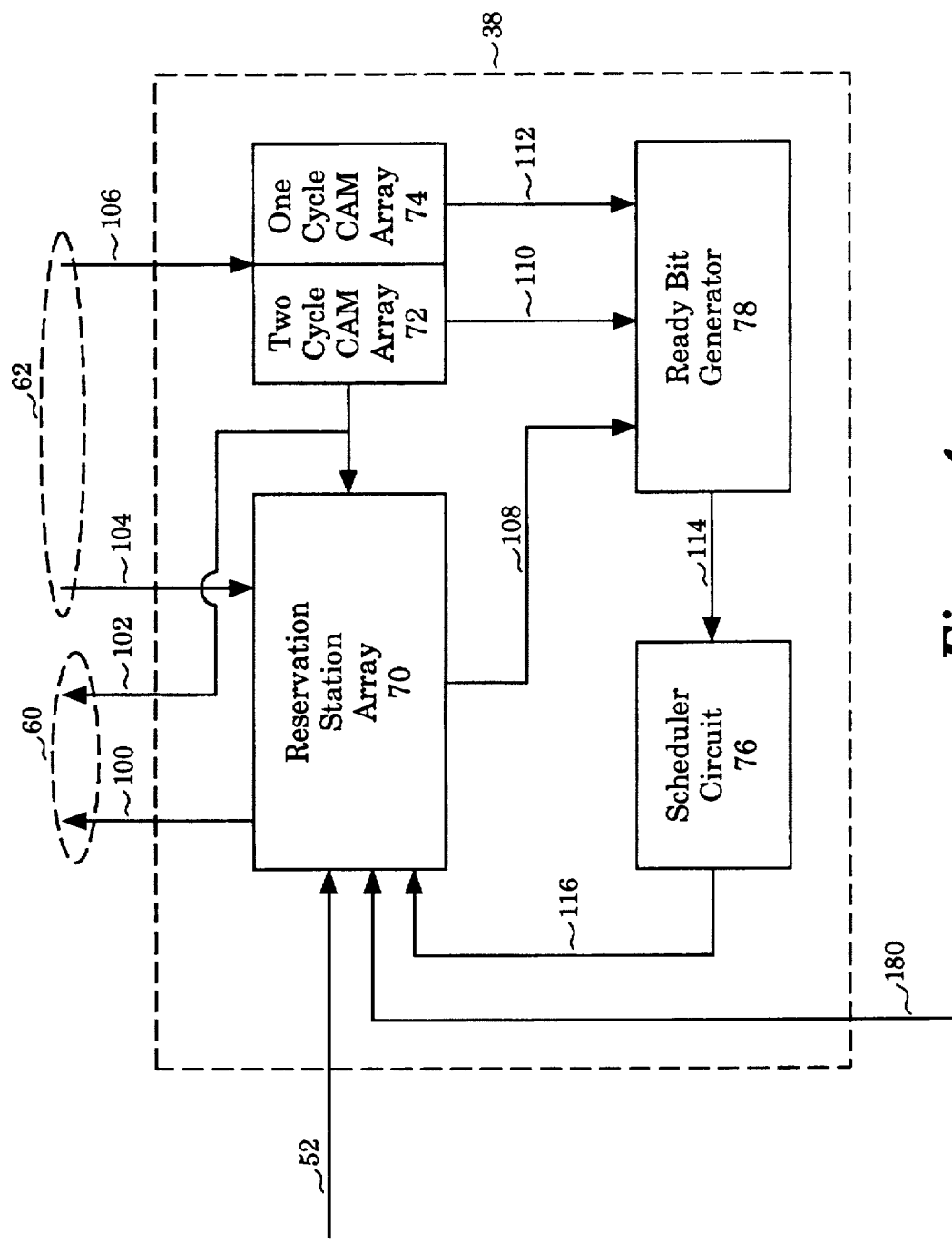
FIG. 4 illustrates the reservation station circuit for one embodiment which comprises a reservation station array, a two cycle content addressable memory (CAM) array, a one cycle CAM array, a scheduler circuit, and a ready bit generator.

FIG. 4 illustrates the reservation station circuit 38 for one embodiment. The reservation station circuit 38 comprises a reservation station array 70, a two cycle content addressable memory (CAM) array 72, a one cycle CAM array 74, a scheduler circuit 76 and a ready bit generator 78. The reservation station array 70, the two cycle CAM array 72, and the one cycle CAM array 74 each contain a set of reservation station entries. Each reservation station entry buffers a micro-op for scheduling and dispatch to the execution circuit 40. For one embodiment, the reservation station array 70 is a static random access memory (SRAM) array and the CAM arrays 72 and 74 are content addressable SRAMs.

The reservation station circuit 38 receives the physical micro ops over the physical micro op bus 52 from the register renaming section 210. The reservation station circuit 38 stores the opcode and the physical destination of each physical micro op received over the physical micro op bus 52 into the reservation station entries allocated by the register renaming section 210 to the physical micro-ops.

The reservation station circuit 38 stores the physical sources psrc1 and psrc2 of each physical micro op received over the physical micro op bus 52 into the CAM entries in the two cycle CAM array 72 allocated by the register renaming section 210 to the physical micro-ops. The reservation station circuit 38 also stores the physical sources psrc1 and psrc2 of each physical micro op into the CAM entries of the one cycle CAM array 74 allocated by the register renaming section 210 to the physical micro-ops.

The reservation station array 70 receives the source data values and corresponding valid flags over the source data bus 180. The reservation station circuit 38 stores the source data values and corresponding valid flags into the reservation station entries of the reservation station array 70 assigned to the physical micro ops.

The reservation station circuit 38 receives the execution results of the dispatched physical micro ops over the result bus 62 from the execution circuit 40. The result bus 62 includes a result data bus 104 and a tag bus 106. The result data bus 62 carries result data values to the reservation station array 70 and the reorder buffer 42. The tag bus 106 carries a tag corresponding to each result data value transferred over the result data bus 104. For one embodiment, the result data bus 104 carries up to three result data values and the tag bus carries up to three physical destination tags during each clock cycle of the processor 12.

The tag on the tag bus 106 corresponding to the result data value comprises the physical destination pdst of the physical micro-op that generates the result data value. The execution circuit 40 transfers the physical destination pdst for an executing physical micro-op over the tag bus 106 two cycles before the transferring the corresponding result data value over the result data bus 104.

The reservation station circuit 38 receives the physical destination tags of nearly completed physical micro-ops over the tag bus 106 from the execution circuit 40. The two cycle CAM array 72 latches the received physical destination tags for later user in the one cycle CAM array 74. The latched physical destination tags are broadcast to all CAM entries of the two cycle CAM array 72 and the one cycle CAM array 74.

The physical destinations received over the tag bus 106 cause the two cycle CAM array 72 to generate a set of match signals 110. The match signals 110 indicate whether any of the two cycle CAM entries detect a CAM match on the received physical destination tag received over the tag bus 106. Each CAM entry in the two cycle CAM array 72 matches to all three physical destination tags received over the tag bus 106 during each clock cycle of the processor 12. Only one CAM entry in the two cycle CAM array 72 can match to the three physical destination tags on the tag bus 106 during each clock cycle of the processor 12.

The CAM entries in the one cycle CAM array 74 receive the latched physical destination tags from the corresponding CAM entries of the two cycle CAM array 72. The latched physical destination tags cause the one cycle CAM array 74 to generate a set of match signals 112. The match signals 112 indicate whether any of the CAM entries of the one cycle CAM array 74 detect a CAM on the latched physical destination tags. Each CAM entry in the one cycle CAM array 74 matches to all three latched physical destination tags.

The reservation station circuit 38 generates a set of write back control signals 102 according to the CAM matches detected in the two cycle CAM array 72 and the one cycle CAM array 74. The write back control signals 102 control the write back of result data values from the result data bus 104 into the reservation station array 70. The write back control signals 102 also control bypassing of result data values at the execution circuit 40.

The ready bit generator 78 receives the match signals 110 and the match signals 112. The ready bit generator 78 also receives the source data valid bits and the entry valid bits of the reservation station entries from the reservation station array 70 over an array bus 108. The ready bit generator 78 determines the reservation station entries having physical micro ops ready for dispatch to the execution circuit 40. The ready bit generator 78 generates a set of ready control signals 114 that indicate the reservation station entries ready for dispatch. The ready bit generator 78 determines that a physical micro op is ready for dispatch if the source data is fully assembled and if all necessary execution resources in the execution circuit 40 will be available when the micro-op reaches the execution circuit 40.

The scheduler circuit 76 selects a set of dispatch physical micro ops from the ready physical micro ops indicated as ready by the ready control signals 114. The scheduler circuit 76 generates a set of dispatch control signals 116. The dispatch control signals 116 cause the reservation station array 70 to dispatch the specified physical micro ops to the execution circuit 40 over the dispatch bus 60. The dispatch bus includes a dispatch data bus that carries source data for the dispatched micro-ops from the reservation station array 70.

Figure 5:
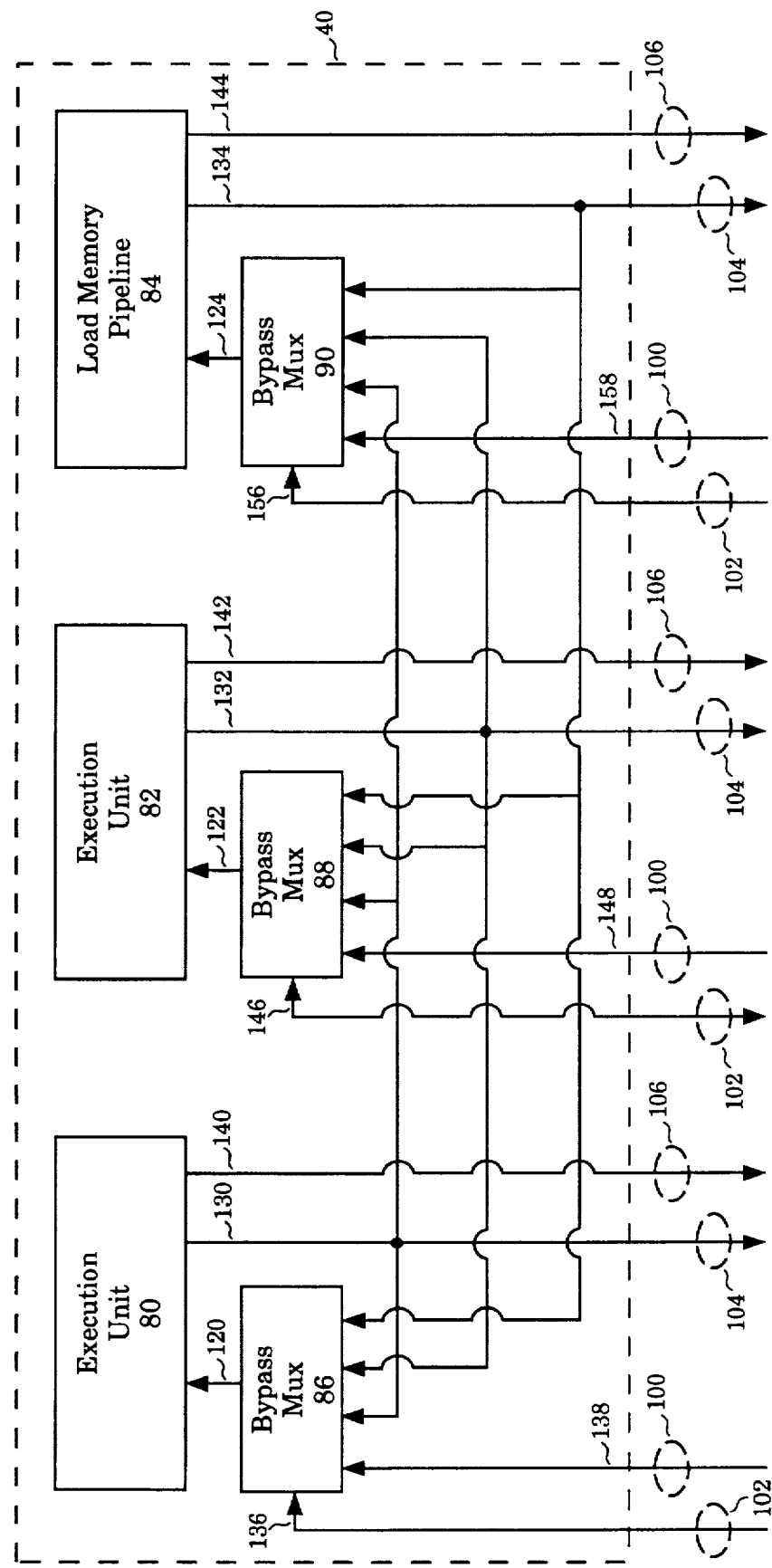
FIG. 5 illustrates the execution circuit for one embodiment which comprises two execution units and a load memory pipeline.

FIG. 5 illustrates the execution circuit 40 for one embodiment. The execution circuit 40 comprises an execution unit 80, an execution unit 82, and a load memory pipeline 84. The execution unit 80 performs single cycle arithmetic logic unit instructions, integer, multiply and divide instructions, and floating point arithmetic instructions. The execution unit 82 performs single cycle arithmetic logic unit instructions and jump instructions. The load memory pipeline 84 performs load memory instructions targeted for the memory subsystem 16.

The dispatch data bus 100 carries a pair of source data values for up to 3 dispatched micro ops during each processor cycle of the processor 12. The source data value pairs comprise a dispatch data pair 138 for the execution unit 80, a dispatch data pair 148 for the execution unit 82, and a dispatch data pair 158 for the load memory pipeline 84.

The result data bus 104 carries result data values over the result data bus 104 for up to three executed physical micro ops during each cycle of the processor 12. The result data comprises result data 130 from the execution unit 80, result data 132 from the execution circuit 82, and result data 134 from the load memory pipeline 84. The tag bus 106 carries physical destination tags for up to 3 micro ops during each cycle of the processor 12. The physical destination tags comprise a physical destination tag 140 from the execution unit 80, a physical destination tag 142 from the execution unit 82, and a physical destination tag 144 from the load memory pipeline 84.

The execution unit 80 receives a source data pair 120 through a bypass multiplexer 86. The bypass multiplexer 86 selects from among the dispatch data 138, the result data 130 from the execution unit 80, the result data 132 from the execution unit 82, and the result data 134 from the load memory pipeline 84. The bypass multiplexer 86 is controlled by a write back control signal 136.

The bypass multiplexer 88 supplies a source data pair 122 to the execution unit 82. The bypass multiplexer 88 selects from among the dispatch data 148, the result data 130, the result data 132, and the result data 134 according to a write back control signal 146. The bypass multiplexer 88 supplies a source data pair 122 to the execution unit 82. Similarly, the bypass multiplexer 90 supplies a source data pair 124 to the load memory pipeline 84 by selecting from among the dispatch data 158, the result data 130, the result data 132, and the result data 134 according to a write back control signal 156.

The execution unit 80 issues the physical destination tag 140 two cycles before transferring the result data 130 over the result bus 60. Similarly, the execution unit 82 issues the physical destination tag 142 two cycles before transferring the result data 132 over the result bus 60, and the load memory pipeline issues the physical destination tag 144 two cycles before transferring the result data 134 over the result bus 60.

FIGS. 6a and 6b illustrate micro-op dispatch by the reservation station circuit 38 without one and two cycle CAM ready scheduling. As shown in FIG. 6a, the reservation station circuit 38 contains a set of reservation station entries RS0–RSn. The reservation station entries RS0–RSn are contained in the reservation station array 70, the two cycle CAM array 72 and the one cycle CAM array 74.

Each reservation station entry RS0–RSn comprises an entry valid (EV) flag, an opcode, a source one data value (SRC1 DATA), a source one valid flag (SRC1V), a source two data value (SRC2 DATA), a source two valid flag (SRC2V), and a physical destination (PDST) contained in the reservation station array 70. The EV flag indicates whether the reservation station entry contains a valid physical micro-op awaiting dispatch to the execution circuit 40. The SRC1 DATA and SRC2 DATA hold source data values for the micro-op received from the reorder buffer 42 over the source data bus 180 or the execution circuit 40 over the result bus 62. The valid flags SRC1V and SRC2V indicate whether the source data values are valid. The PDST specifies the physical destination in the reorder buffer 42 to buffer the results from execution of the corresponding physical micro-op.

Each reservation station entry RS0–RSn corresponds to a pair of two cycle CAM entries (PSRC1 and PSRC2) in the two cycle CAM array 72. Each reservation station entry RS0–RSn also corresponds to a pair of one cycle CAM entries (PSRC1 and PSRC2) in the one cycle CAM array 74. The PSRC1 and PSRC2 CAM entries in the CAM arrays 72 and 74 hold the physical sources psrc1 and psrc2 of the corresponding physical micro-op. The physical sources psrc1 and psrc2 specify the physical destinations in the reorder buffer 42 that buffer the source data values for the corresponding physical micro-op. The PSRC1 and PSRC2 CAM entries in the CAM arrays 72 and 74 are used to detect the source data values transferred over the result bus 62 during result data write back.

The reservation station entry RS0 contains a valid micro op (UOP-A) comprising ADD PSRC1=22, PSRC2=31, PDST=33. The physical sources PSRC1=22 and PSRC2=31 are stored in the RS0 entries of the two cycle CAM array 72 and the one cycle CAM array 74. The valid source one data value=100 was received from the physical destination=22 of the reorder buffer 42 over the source data bus 180. The valid source two data value=300 was received from the physical destination=31 of the reorder buffer 42 over the source data bus 180.

The reservation station entry RS1 contains a valid micro op (UOP-B) comprising SUB PSRC1=23, PSRC2=33, PDST=35. The source one data value=555 is valid, and the source two data value is initially invalid (SRC2V=0). The micro op in RS1 is data dependent on the results of the micro op in RS0 because the physical destination PDST=33 of RS0 corresponds to the physical source PSRC2=33 of RS1.

FIG. 6b illustrates the dispatch and execution of the micro ops in reservation station entries RS0 and RS1 without one and two cycle CAM ready scheduling. The ready bit generator 78 receives the opcode, entry valid flag, and source one and source two valid flags from RS0 and RS1 over the array bus 108 and determines that the micro-op in RS0 is ready for dispatch. The ready bit generator 78 issues the ready control signals 114 to indicate that RS0 is ready for dispatch.

The scheduler circuit 76 selects the micro op in reservation station entry RS0 for dispatch to the execution unit 80, and issues the dispatch control signals 116. The dispatch control signals 116 cause the reservation station array 70 to transfer the micro op from RS0 to the execution unit 80 over the dispatch bus 60.

The reservation station circuit 38 dispatches the micro-op UOP-A from RS0 between times $t_0$ and $t_1$ during a micro-op dispatch (DISP) phase of the processor 12 pipeline. Between times $t_1$ and $t_2$ the write back control signal 136 selects the dispatch data 138 from the reservation station array 70 during a source data bypass phase. The dispatch data 138 comprises the source data pair=100, 300 from RS0. The reservation station circuit 38 issues the write back control signal 136 to select the dispatch data 138 assuming that the two cycle CAM match and the one cycle CAM match are disabled.

Between times $t_2$ and $t_3$ the execution unit 80 executes the micro op ADD 100, 300, PDST=33 during an execution (EU) phase of the processor 12 pipeline. During a result write back (WB) phase between times $t_3$ and $t_4$ the execution unit 80 transfers the result data 130 over the result data bus 104. Between times $t_3$ and $t_4$ the result data value=400 is available on the result data bus 104. The execution unit 80 transfers the physical destination tag=33 over the tag bus 106.

At time $t_4$ the reservation station circuit 38 stores the result data value=400 on the result data bus 104 into the source two data field of RS1 as specified by the match between the PDST=33 of RS0 and the PSRC2=33 of RS1. The reservation station circuit 38 also sets the source two valid flag of RS1 to indicate valid source two data (SRC2V= 1).

During a ready (RDY) phase between times $t_4$ and $t_5$ the ready bit generator 78 determines that the micro-op in RS1 is ready for dispatch. During a schedule (SCHED) phase between times $t_5$ and $t_6$ the scheduler circuit 76 selects the micro op in RS1 for dispatch to the execution unit 80, and issues the dispatch control signals 116 to dispatch the micro op UOP-B from RS1 to the execution unit 80 over the dispatch bus 60 during the dispatch phase between times $t_6$ and $t_7$. Between times $t_7$ and $t_8$ the write back control signal 136 selects the dispatch data 138 from the reservation station array 70 during a source data bypass phase.

As shown in FIG. 6b, a two cycle latency occurs between the time the result data from UOP-A is available on the result data bus 104 and the time the corresponding dependent source data for UOP-B arrives at the execution unit 80. The two cycle latency corresponds to the two cycle latency required by the reservation station circuit 38 to perform the ready, schedule and dispatch functions.

FIGS. 7a and 7b illustrate micro-op dispatch by the reservation station circuit 38 with two cycle CAM ready scheduling. As shown in FIG. 7a, the reservation station entry RS0 contains a valid load memory micro op LD PSRC1=16, PSRC2=18, PDST=22 (UOP-C). The source one data value=1000 in RS0 is valid, and the source two data value=80 in RS0 is valid.

The reservation station entry RS1 contains a valid micro op ADD PSRC1=22, PSRC2=19, PDST=23 (UOP-D). The source one data value in RS1 is initially invalid (SRC1V=0). The source two data value in RS1 is valid and equal to 333. The UOP-D is data dependent on the UOP-C since the PDST=22 of RS0 corresponds to the PSRC1=22 of RS1. The reservation station entry RSn contains a valid micro op SUB PSRC1=20, PSRC2=22, PDST=27 with a valid source one data value=400 and an invalid source two data value. The micro-op in RSn is data dependent on the UOP-C since the PDST=22 of RS0 corresponds to the PSRC2=22 of RSn.

FIG. 7b illustrates the dispatch and execution of the micro ops in reservation station entries RS0 and RS1 with two cycle CAM ready scheduling. During a dispatch phase between times $t_{10}$ and $t_{11}$ the reservation station circuit 38 dispatches the UOP-C from RS0 to the load memory pipeline 84 over the dispatch bus 60. During a bypass phase between times $t_{11}$ and $t_{12}$ the reservation station circuit 38 issues the write back control signal 136 to select the dispatch data pair 138 comprising the source data values=1000, 80 from RS0.

Between times $t_{12}$ and $t_{13}$ an address generation unit (AGU) in the load memory pipeline 84 calculates a physical address from the load memory operation specified by the UOP-C. Between times $t_{13}$ and $t_{14}$ the load memory pipeline 84 issues the physical destination tag=22 of the UOP-C over the tag bus 106 which indicates that the result data for the UOP-C will be available two cycles later.

During a ready phase between times $t_{14}$ and $t_{15}$ the two cycle CAM array 72 detects a CAM match on the tag 140 (the physical destination tag=22) and generates a CAM match signal corresponding to the PSRC1=22 in RS1. Between times $t_{14}$ and $t_{15}$ the match signals 110 indicate a CAM match to the PSRC1=22 in RS1 and cause the ready bit generator 78 to determine that the UOP-D in RS1 is ready for dispatch. The load memory pipeline 84 processes the result data from an internal data cache unit (DCU).

During a schedule phase between times $t_{15}$ and $t_{16}$ the scheduler circuit 76 schedules the UOP-D in RS1. Between times $t_{16}$ and $t_{17}$ the data cache unit of the load memory pipeline 84 processes UOP-C. During a dispatch phase between times $t_{16}$ and $t_{17}$ the scheduler circuit 76 causes the reservation station array 70 to dispatch the UOP-D to the execution unit 80 over the dispatch bus 60. The reservation station array 70 transfers the source two data value=333 over the dispatch data bus 100 as the source two data of the source data pair 138.

During a write back phase of the UOP-C between times $t_{17}$ and $t_{18}$ the load memory pipeline 84 transfers result data 134 for the UOP-C over the result bus 62. The two cycle CAM array 72 issues the write back control signal 136 to cause the bypass multiplexer 86 to select the result data 134 as the source one data value of the source data pair 120 to the execution unit 80. The result data 134 for the UOP-C is available to the execution unit 80 during the same phase that the data dependent UOP-D arrives at the execution unit 80. The reservation station array 70 stores the result data 134 into the source two data field RSn which data dependent on the results of UOP-C, and sets the SRC2V flag for RSn.

FIGS. 8a and 8b illustrate micro-op dispatch by the reservation station circuit 38 with one cycle CAM ready scheduling. As shown in FIG. 8a, the reservation station entry RS0 contains a valid micro op ADD PSRC1=3, PSRC2=4, PDST=9 (UOP-E). The source one data value= 200 and the source two data value=100 in RS0 for the UOP-E are both valid. The reservation station entry RS1 contains a valid micro op (UOP-F) comprising ADD PSRC1=7, PSRC2=9, PDST=11. The UOP-F is data dependent on the result of the UOP-E. The UOP-F has a valid source one data value=80 and an invalid source two data value that is data dependent on the UOP-E results since the PSRC2=9 of RS1 corresponds to the PDST=9 of RS0. The reservation station entry RSn contains a valid micro op LD PSRC1=8, PSRC2=9, PDST=13 with a valid source one data value=100 and an invalid source two data value. The micro-op in RSn is data dependent on the UOP-E since the PDST=9 of RS0 corresponds to the PSRC2=9 of RSn.

During a dispatch phase for the UOP-E between time $t_{20}$ and $t_{21}$ the reservation station circuit 38 dispatches the opcode ADD, the source one and two data values=200, 100, and the physical destination=9 to the execution circuit 80 over the dispatch bus 60. The reservation station circuit 38 issues the write back control signal 136 to cause the bypass multiplexer 86 to select the source data 138 as the source data pair 120 to the execution unit 80.

Between times $t_{21}$ and $t_{22}$ the execution unit 80 transfers the physical destination tag=9 over the tag bus 106 to indicate that the execution result for the UOP-E will be available on the result data bus 104 one cycle later. During a ready phase for the UOP-F between times $t_{22}$ and $t_{23}$ the one cycle CAM array 74 detects a CAM match on the physical destination tag=9 corresponding to the physical source PSRC2 of RS1 and the PSRC2 of RSn. The match signals 112 indicate the one cycle CAM match for PSRC2 of RS1 and RSn, and cause the ready bit generator 78 to determine that the UOP-F and the micro-op in RSn are ready for dispatch.

During a schedule phase for the UOP-F between times $t_{23}$ and $t_{24}$ the scheduler circuit 76 selects the UOP-F in RS1 for dispatch according to the ready control signals 114 from the ready bit generator 78. During a write back phase for the UOP-E between times $t_{23}$ and $t_{24}$ the result data for the UOP-E is available on the result data bus 104 from the execution unit 80. The reservation station circuit 38 writes the result data 130 from the execution unit 80 into the source two data field of the RS1 and RSn and sets the corresponding SRC2V flags.

During a dispatch phase for the UOP-F between times $t_{24}$ and $t_{25}$ the reservation station circuit 38 dispatches the opcode ADD, the source one and two data values=80, 300, and the physical destination=11 over the dispatch bus 60 to the execution circuit 80. During a bypass phase for the UOP-F between times $t_{25}$ and $t_{26}$ the reservation station circuit 38 issues the write back control signal 136 to cause the bypass multiplexer 86 to select the source data pair 138 for the execution unit 80.

As shown in FIG. 8b, a one cycle latency occurs between the time the result data from UOP-E is available on the result data bus 104 and the time that the corresponding dependent source data for UOP-F arrives at the execution unit 80.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A processor, comprising:
   an instruction buffer comprising a plurality of instruction entries;
   a content addressable memory (CAM) array unit coupled to said instruction buffer, said CAM unit comprising a first array having two cycle CAM entries corresponding to a set of said instruction entries, and a second array having one cycle CAM entries corresponding to a set of said instruction entries, each CAM entry storing at least one source tag for the corresponding instruction entry, the content addressable memory array unit receiving a result tag from an execution circuit over a result bus, each CAM entry generating a CAM match signal if the result tag matches the source tag;
   a ready generation circuit coupled to said CAM array unit, said ready generation circuit receiving the CAM match signals and selecting the instruction entry that corresponds to the source tag for dispatch to the execution circuit.

2. The processor of claim 1, wherein the instruction buffer dispatches an instruction from the instruction entry that corresponds to the source tag to the execution circuit over a dispatch bus while the execution circuit transfers a result data value corresponding to the result tag over the result bus.

3. The processor of claim 2, further comprising a bypass circuit coupled to the result bus, the bypass circuit coupling the result data value on the result bus to a dispatch source data bus for the execution circuit while the instruction is received by the execution circuit over the dispatch bus.

4. The processor of claim 3, wherein the execution circuit transfers the source tag over the result bus at least one cycle of the processor before transferring the result data value over the result bus.

5. The processor of claim 4, wherein the instruction buffer stores the result data value into a source data field of the instruction entries corresponding to the source tag.

6. A processor comprising:
   an instruction buffer comprising a plurality of instruction entries;
   a content addressable memory (CAM) array unit coupled to said instruction buffer, said CAM array unit comprising at least one CAM entry corresponding to each instruction entry, each CAM entry storing at least one source tag for the corresponding instruction entry, the content addressable memory array receiving a result tag from an execution circuit over a result bus, each CAM entry generating a CAM match signal if the result tag matches the source tag;
   a ready generation circuit, coupled to said CAM unit, said ready generation circuit receiving the CAM match signals and selecting the instruction entry that corresponds to the source tag for dispatch to the execution circuit;
   said CAM array unit having a first content addressable memory array comprising two cycle CAM entries corresponding to a set of instruction entries, each two cycle CAM entry storing the source tag for a corresponding instruction entry, each two cycle CAM entry generating a two cycle CAM match signal if the result tag matches the corresponding source tag; and
   said CAM array unit further having a second content addressable memory array comprising one cycle CAM entries corresponding to a set of said instruction entries, each one cycle CAM entry storing the source tag for a corresponding instruction entry, each one cycle CAM entry generating a one cycle CAM match signal if the result tag matches the corresponding source tag.

7. The processor of claim 6, wherein the two cycle cam match signals cause the ready generation circuit to select the instruction entry that corresponds to the source tag during one cycle of the processor and causes dispatch of an instruction from the instruction entry that corresponds to the source tag during a next cycle of the processor while the execution circuit transfers a result data value corresponding to the result tag over the result bus.

8. The processor of claim 6, wherein the one cycle cam match signals cause the ready generation circuit to select the instruction entry that corresponds to the source tag during one cycle of the processor while the execution circuit transfers a result data value corresponding to the result tag over the result bus, the one cycle cam match signals causing dispatch of an instruction from the instruction entry that corresponds to the source tag during a next cycle of the processor.

9. A method for scheduling instructions in a computer system having processor, comprising the computer implemented steps of:

buffering a set of instructions in one and two cycle content addressable memory (CAM) array units;

receiving a result tag from an execution circuit over a result bus, and determining whether the result tag matches a source tag of one of said instructions buffered in said one and two cycle content addressable memory (CAM) array units;

selecting the instruction entry that matches the source tag for dispatch to the execution circuit.

10. The method of claim 9, further comprising the step of dispatching an instruction from the instruction entry that matches the source tag to the execution circuit over a dispatch bus while the execution circuit transfers a result data value corresponding to the result tag over the result bus.

11. The method of claim 10, further comprising the step of coupling the result data value on the result bus to a dispatch source data bus for the execution circuit while the instruction is dispatched over the dispatch bus.

12. The method of claim 11, wherein the execution circuit transfers the source tag over the result bus at least one cycle of the processor before transferring the result data value over the result bus.

13. The method of claim 12, further comprising the step of storing the result data value into a source data field of the instruction entry corresponding to the source tag.

14. The method of claim 10, wherein the step of determining whether the result tag matches the source tag of one of the instructions buffered in said two cycle CAM array unit is performed during one cycle of the processor and the step of dispatching an instruction from the instruction entry that matches the source tag to the execution circuit over a dispatch bus is performed during a next cycle of the processor while the execution circuit transfers the result data value corresponding to the result tag over the result bus.

15. The method of claim 10, wherein the step of determining whether the result tag matches the source tag of one of the instructions buffered in said one cycle CAM array unit is performed during one cycle of the processor while the execution circuit transfers the result data value corresponding to the result tag over the result bus, and the step of dispatching an instruction from the instruction entry that matches the source tag to the execution circuit over a dispatch bus is performed during a next cycle of the processor.

16. A circuit for scheduling instructions in a processor, comprising:

circuitry for buffering a set of instructions, said circuitry for buffering including one and two cycle content addressable memory (CAM) array units;

circuitry for receiving a result tag from an execution circuit over a result bus, and determining whether the result tag matches a source tag of one of the instructions buffered in said circuitry for buffering;

circuitry for selecting the instruction entry that matches the source tag for dispatch to the execution circuit.

17. The circuit of claim 16, further comprising circuitry for dispatching an instruction from the instruction entry that matches the source tag to the execution circuit over a dispatch bus while the execution circuit transfers a result data value corresponding to the result tag over the result bus.

18. The circuit of claim 17, further comprising circuitry for coupling the result data value on the result bus to a dispatch source data bus for the execution circuit while the instruction is dispatched over the dispatch bus.

19. The circuit of claim 18, wherein the execution circuit transfers the source tag over the result bus at least one cycle of the processor before transferring the result data value over the result bus.

20. The circuit of claim 19, further comprising circuitry for storing the result data value into a source data field of the instruction entry corresponding to the source tag.

21. The circuit of claim 17, wherein the determination of whether the result tag matches the source tag of one of the instructions buffered in said two cycle CAM array unit occurs during one cycle of the processor and the dispatch of the instruction from the instruction entry that matches the source tag to the execution circuit over the dispatch bus occurs during a next cycle of the processor while the execution circuit transfers the result data value corresponding to the result tag over the result bus.

22. The circuit of claim 17, wherein the determination of whether the result tag matches the source tag of one of the instructions buffered in said one cycle CAM array unit occurs during one cycle of the processor while the execution circuit transfers the result data value corresponding to the result tag over the result bus, and the dispatch of the instruction from the instruction entry that matches the source tag to the execution circuit over the dispatch bus occurs during a next cycle of the processor.

* * * * *